United States Patent [19]

Klebl et al.

[11] Patent Number: 4,881,489
[45] Date of Patent: Nov. 21, 1989

[54] COLOR CODING LIGHT WAVE CONDUCTORS

[75] Inventors: Wolfram Klebl, Isernhagen; Rainer Bruenn, Essel; Harry Staschewski, Langenhagen, all of Fed. Rep. of Germany

[73] Assignee: Kabelmetal Electro GmbH, Hanover, Fed. Rep. of Germany

[21] Appl. No.: 207,117

[22] Filed: Jun. 14, 1988

[30] Foreign Application Priority Data

Jun. 16, 1987 [DE] Fed. Rep. of Germany ....... 3720044

[51] Int. Cl.⁴ .......................... B05C 9/14; B05C 11/00
[52] U.S. Cl. ...................................... 118/672; 118/33; 118/420; 118/712
[58] Field of Search ................. 118/674, 712, 33, 234, 118/672, 325, 420; 427/175, 178

[56] References Cited

U.S. PATENT DOCUMENTS 2,283,014  5/1942  Reid ................................. 118/33 X
4,554,179  11/1985  Roderburg ......................... 427/163

Primary Examiner—Evan Lawrence
Attorney, Agent, or Firm—Ralf H. Siegemund

[57] ABSTRACT

An apparatus for color coding and dyeing or otherwise marking a light wave conductor optical fiber includes a dyeing stage and a drying stage; the conductor is unreeled from a spool for passing through the stages, the marked conductor is taken up by another spool or the like, and a downstream drive is coupled to the conductor for moving it at a particular speed through the dyeing and drying stages. An upstream drive mechanism is also coupled to the conductor upstream from the dyeing stage for pulling the same from the supply spool, and includes a drive controlled towards the same speed as the downstream drive and a compensating roller to ensure sufficient tension in the conductor so that the upstream and downstream speeds are similar.

7 Claims, 1 Drawing Sheet

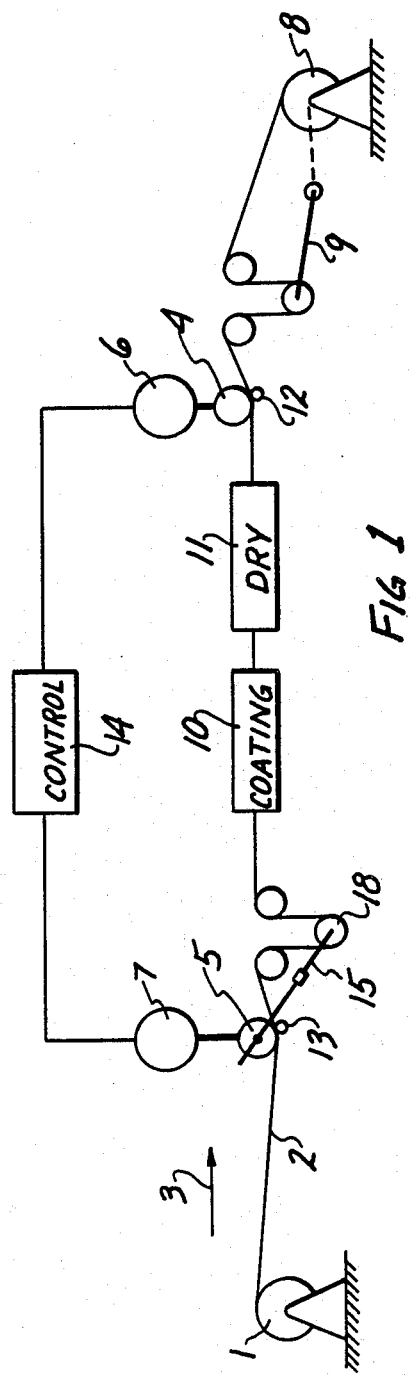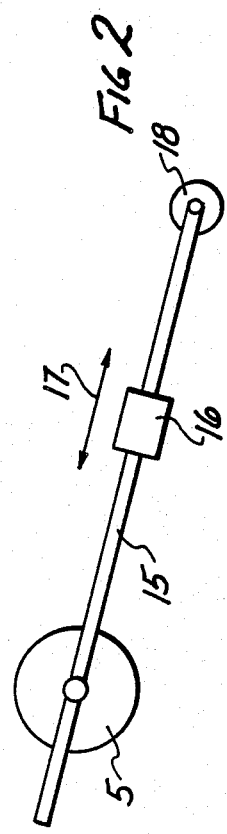

COLOR CODING LIGHT WAVE CONDUCTORS

BACKGROUND OF THE INVENTION

The present invention relates to color coding and color marking of a light wave conductor optical (fiber) under utilization of a controllable feed for the conductor, a dyeing station, a facility for dryiing the dye that has been applied, and a take-up spool for the marked conductor.

A device of the type to which the invention pertains broadly is described, for example, in German Patent 34 07 520. Light wave conductors and optical fiber elements are used to an increasing extent in communication, particularly for long distance communication. In the following we will designate light wave conductors and fiber optic elements by the abbreviation LWC or LWC cable, whereby a "cable" is assumed to have a number, possibly a large number, of LWCs made of glass or a transparent synthetic.

LWCs are used in communication engineering to an increasing extent as replacement for metallic conductors. An LWC cable consists basically of a core assembly made of multiple optical conductors of the LWC type and the entire arrangement is jacketed in a suitable envelope or outer cover.

LWCs are advantageous over metallic conductors for a variety of reasons. Among them are that optical elements can be bent and are flexible even at small diameter and small radii. They are by themelves very small so that the cable cross-section is small and, of course, noise is drastically reduced as compared with signal conduction through metal wires. On the other hand, LWCs are relatively brittle and sensitive against tension and compression. Hence, during manufacture, particularly during the manufacture of LWC cable, they have to handled quite carefully, which, in terms of mass production, is usually a more expensive undertaking. This kind of constraint exists also for marking and otherwise identifying and color coding LWCs or LWC cables under utilization of different dyes, dye patterns, etc. The color coding and other markings are usually necessary for identifying individual LWCs in order to effect the right connection on either end.

As stated above, the German Patent 3,407,520 discloses a process of continuous color coding of a surface of such an optical and light wave conductor by running it through a particular dyeing chamber. Entrance and exit openings of that chamber are provided by means of nipples which snugly embrace the LWC when entering and leaving. The purpose thereof is to confine the dye to the dyeing chamber. These nipples, however, are, so to speak, stationary points and thus in sliding engagement with the LWCs. These nipples can readily damage the LWCs, particularly in those instances when they aare not run into and out of the dyeing chamber i nan exactly concentric fashion and as far as the restrictive nipple opening is concerned. Also oscillations can be set up and, in the case of defective equipment, these oscillations may propagate into the dying chamber, thus interfering with the color coding process. If, then, the LWC is not run straight into and through the chamber and undergoes vibrations, it is quite possible that the coding is some form or another is incomplete, possibly even false.

SUMMARY OF THE INVENTION

It is an object of the present invention to provide a new and improved method and apparatus for color coding an LWC as defined which is independent from the withdrawal and moving speed, making sure the LWC will not undergo vibrations and is handled in a rather gentle fashion.

In accordance with the preferred embodiment of the present invention, the object is attained in the following fashion. In addition to the feed drive for the LWC, a second speed controlled drive is provided and located upstream from the first drive and from the dyeing equipment, the speed being controlled under utilization of a dancer pulley (compensation wheel) riding on the LWC behind, i.e., downstream, of the second drive but still upsream from the dyeing equipment, and both drives are controlled towards exactly the same speed in terms of desired speed value. Hency, by operation of this procedure, the LWC is caused to move extremely uniformly between the two drives, "uniform" to be understood in terms of similar controlled speed. Any effects tending to interfere with that uniformity will be eliminated through the compensation pulley, by means of which the second drive is being controlled.

One can also say that the two drives are controlled towards the same speed, either in an open loop or in a closed loop configuration. In addition, the upstream drive is slaved to the downstream one to the extent the pulling of the downsstream drive reflects upstream on the LWC being pulled, and that is monitored by the compensation roller.

It was found that the response of control is a very rapid one. Indeed, this way one makes sure that the LWC not only moves uniformly but straight, without vibration, and in that fashion it is then run through the dyeing equipment and any other downstream stations for further working, processing, etc. The invention is believed to maximize avoiding damage to the LWC and ensures, moreover, a uniform application of ddye. The force by means of which the compensation roller or pulley engages the LWC is rather simply adjustable through the application of adjustable or selectable supplemental weights. Moreover, and within the same equipment, one can handle differently configured LWCs requiring, possibly, different speeds of withdrawal. Simply by changing the weight for the compensating roller or pulley, one can provide for the proper adjustment of the control dynamics within the system.

DESCRIPTION OF THE DRAWINGS

While the specification concludes with claims particularly pointing out and distinctly claiming the subject matter which is regarded as the invention, it is believed that the invention, the objects and features of the invention, and further objects, features and advantages thereof will be better understood from the following description taken in connection with the accompanying drawings in which:

FIG. 1 shows in a somewhat schematic fashion a device and equipment for carrying out the method in accordance with the preferred embodiment of the present invention for practicing the best mode thereof; and FIG. 2 shows a detail as indicated in FIG. 1 and concerning a specific aspect and structure being shown on an enlarged scale.

Proceeding now to a detailed description of the drawings, FIG. 1 illustrates a supply spool or reel 1 on which is wound a light wave conductor LWC 2 to be withdrawn from the spool 2 in the direction of arrow 3. The particulars of the construction of the LWC are unimportant. It is an important aspect of the invention that the device is applicable to many kinds of LWCs and, in particular, it does not matter whether the basic element is made of glass or a transparent synthetic. Also, the dimensions are not relevant for practicing the invention.

For purposes of withdrawing the LWC from the spool 1, one uses two drives 4 and 5. Each of them may be constructed as sheave, pulley, or drum, and they include, respectively, speed controlled electromotors 6 and 7. The drives 4 and 5 alternatively could be established through ribbons, pulleys, caterpillars, or the like. Basically, they both pull the LWC 2 from the spool 1. Their task is to pull the LWC through several stations in an extremely uniform manner. The processed LWC 2 will, at the end of the procedure, be wound on a reel or spool 8. The dye is presumed to have dried in the meantime. The supply spool 8 may have its own drive 8' which is speed controlled through a compensation pulley and control lever 9, which control is independent from the equipment to be described next, and could be constructed differently.

The basic purpose of the equipment is to pass the LWC through a dye equipment 10 by means of which, for example, its entire surface is continuously or discontinuously painted or coated to permit a color coding identification. The color and dye may be uniform or variable; annular bands or longer coated fields may be provided. This also is not a relevanat aspect of the invention. Important, however, is that whatever code and whatever dye coating is to be applied is to be uniform, positive, and of definite configuration and intensity.

Reference numeral 11 refers generally to the drying of the LWC 2 as it leaves with the color coding and dyeing equipment 10. It does not really matter whether or not the drying is a positive one in terms of active drying, e.g., through heating, air blowing, or both, or just exposure to air ambient action may suffice. The withdrawal equipment 4 and 5 is respectively arranged downstream and upstream from this process equipment 10 and 11. This way it is ensured that the LWC 2 passes through the dyeing equipment 10 and the dryer 11, in a straight fashion, at a uniform speed, and without vibrations.

The upstream drive 5 is comprised of a sheave cooperating with a pinch roller 13. Sheave 5 is driven by a motor 7, which is controlledd from a control circuit 14. Analogously and downstream from the equipment 10 and 11, there is, as stated, the drive 4 cooperating with a pinch roller 12 and being driven by another electromotoro 6 which, in turn, is likewise driven from the electronic control circuit 14.

By way of example, the motors 6 and 7 may be run in an open loop configuration in that they receive identical or calibrated basically similar signals for purposes of running these motors at the same constant speed. The circuit is illustrated in a simplified fashion. It is, of course, possible to provide an electronic feedback configuration in which the drive speed of each of the motors 6 and 7 is measusred and fed back and compared with a referencing signal being the same so that both motors do run positively at identical speeds.

Independently from any individual control circuit and other equipment, inherent as well as spsoradic deviations from constant speed conditions which are assumed to be taken care of by the electronic control circuit 14, as far as the motors 6 and 7 are concerned, there may be variations in tension in the LWC or the like which may impart upon the equipment the tendency of deviation from uniformity as far as passage of LWC 2 through the equipment 10 and 11 is concerned. From a different point of view, drive 4 pulls the LWC 2 so that upstream from equipment 10 a particular speed obtains. If that speed is the same as the one imparted upon LWC 2 by drive 5, uniformity is ensured; any deviation reflects in unbalancing of a balancing compensating dancing roller 18. ROller 18 is held in or on a loop of the LWC 2.

Compensating roller 18 sits on a lever 15 upon which is mounted an adjustable weight 16. A double arrow 17 denotes the adjustment, and, shifting the weight 16, changes the lever action and thereby the effective weight the roller 18 exerts upon the LWC 2. This roller 18 will automatically compensate speed variations and it will modify the drive force of sheave 5, thus ensuring vibration-free passage of LWC 2, as stated, through he dyeing equipment 10 and further equipment downstream thereof. The particular roller 18 also eliminates feedback effects exerted by the dyeing equipment for some reason or the other upon LWC 2.

The invention is not limited to the embodiments described above, ut all changes and modifications thereof not constituting departures from the spirit and scope of the invention are intended to be included.

We claim:

1. In an apparatus for color coding and dyeing or otherwise marking a light wave conductor optical fiber passing through dyeing equipment and a drying stage and being unreeled from a spool for such passage, the marked conductor being taken up by another spool or the like, the improvement comprising:
    first and second drives respectively arranged upstream and downstream from the dyeing equipment in engagement with the conductor for pulling the same from the supply spool and through the dyeing equipment; and
    control means for ensuring uniformity in the driving and a particular linear drive speed of the conductor as being driven by the first and second drives, and as passed by them through the dyeing equipment.

2. Apparatus as in claim 1, said control means including a compensating roller having an adjustable weight and engaging the conductor in a location in between the first and second drives.

3. Apparatus as in claim 1, each of the drives including a driving sheave and a pinch roller cooperating with the respective sheave.

4. Apparatus as in claim 1, said control means including means (a) connected for operating the second drive at a downstream speed, and means (b) for operating the first drive and for driving the conductor on the upstream side to match its speed to the downstream speedd.

5. Apparatus as in claim 4, the means (b) including a compensating roller engaging the conductor for compensating differences between upstream and downstream speeds as they affect a length of the conductor passing through the dyeing equipment.

6. In an apparatus for color coding and dyeing or otherwise marking a light wave conductor optical fiber passing through dyeing equipment and a drying stage and being unreeled from a spool for such passage, the marked conductor being taken up by another spool or the like, the improvement comprising:
- a downstream drive coupled to the conductor for moving the conductor at a particular speed through the dyeing equipment and drying stage; and
- upstream drive means coupled to the conductor upstream from the dyeing equipment for pulling same from the supply spool and including control means for causing the conductor to enter the dyeing equipment at downstream speed.

7. Apparatus as in claim 6, the upstream drive means including a drive controlled towards the same speed as the downstream drive and compensating roller means engaging the conductor so that the upstream and downstream speeds are similar.

* * * * *